(12) United States Patent
Robertson

(10) Patent No.: US 9,591,236 B2
(45) Date of Patent: Mar. 7, 2017

(54) SYSTEM AND METHOD FOR IMAGE PROCESSING AND GENERATING A BODY MODEL

(71) Applicant: METAIL LIMITED, London (GB)

(72) Inventor: Duncan Paul Robertson, Surrey (GB)

(73) Assignee: METAIL LIMITED, London (GB)

( * ) Notice: Subject to any disclaimer, the term of this patent is extended or adjusted under 35 U.S.C. 154(b) by 731 days.

(21) Appl. No.: 13/952,898

(22) Filed: Jul. 29, 2013

(65) Prior Publication Data

US 2013/0308017 A1    Nov. 21, 2013

Related U.S. Application Data

(62) Division of application No. 12/881,861, filed on Sep. 14, 2010, now Pat. No. 8,605,148.

(30) Foreign Application Priority Data

Sep. 15, 2009    (GB) .................................. 0916185.2

(51) Int. Cl.
*H04N 7/18* (2006.01)
*H04N 5/262* (2006.01)
(Continued)

(52) U.S. Cl.
CPC ........... *H04N 5/2621* (2013.01); *F21V 33/00* (2013.01); *G06T 11/60* (2013.01); *H04N 5/275* (2013.01); *H04N 2005/2726* (2013.01)

(58) Field of Classification Search
CPC ...................................................... G06T 13/80
(Continued)

(56) References Cited

U.S. PATENT DOCUMENTS 5,830,065 A    11/1998   Sitrick
7,822,121 B2   10/2010   Rangam et al.
(Continued)

FOREIGN PATENT DOCUMENTS

CN    2815148     9/2006
EP    0 933 728   8/1999
(Continued)

OTHER PUBLICATIONS

Search Report dated Dec. 15, 2009, directed to GB Application No. 0916185.2; 2 pages.
(Continued)

*Primary Examiner* — Andy Rao
(74) *Attorney, Agent, or Firm* — Morrison & Foerster LLP

(57) ABSTRACT

Images of foreground objects in a scene are generated by causing electromagnetic radiation to be emitted having a first spectral power distribution from a surface of a first foreground object, which is adjacent or at least partially obscured by a second foreground object. A first image of both of the first and second foreground objects is acquired while the first foreground object emits electromagnetic radiation with the first spectral power distribution. A second image of the first and second foreground objects is acquired while the first foreground object is not emitting electromagnetic radiation or is emitting electromagnetic radiation with a second spectral power distribution which is different to the first spectral power distribution. An alpha matte of the first and second foreground objects is generated based on a comparison of the first image and second image.

37 Claims, 11 Drawing Sheets

(51) Int. Cl.
 *H04N 5/275* (2006.01)
 *F21V 33/00* (2006.01)
 *G06T 11/60* (2006.01)
 *H04N 5/272* (2006.01)

(58) Field of Classification Search
 USPC .......................................... 348/77, 135–140
 See application file for complete search history.

(56) References Cited

U.S. PATENT DOCUMENTS

| | | | | |
|---|---|---|---|---|
| 8,605,148 | B2* | 12/2013 | Robertson | H04N 5/275 348/135 |
| 2002/0130804 | A1* | 9/2002 | McMakin | G01S 7/20 342/22 |
| 2003/0085907 | A1 | 5/2003 | Matsuoka et al. | |
| 2007/0285560 | A1 | 12/2007 | Perlman | |
| 2014/0176565 | A1* | 6/2014 | Adeyoola | G06T 13/80 345/473 |

FOREIGN PATENT DOCUMENTS

| | | |
|---|---|---|
| EP | 1 909 493 | 4/2008 |
| GB | 363767 | 12/1931 |
| GB | 2 129 965 | 5/1984 |
| JP | 3-267015 | 11/1991 |
| JP | 4-37383 | 2/1992 |
| JP | 9-106419 | 4/1997 |
| JP | 11-73491 | 3/1999 |
| JP | 2001-117962 | 4/2001 |
| JP | 2001-249957 | 9/2001 |
| JP | 2002-58045 | 2/2002 |
| JP | 2006-35834 | 2/2006 |
| KR | 10-2005-0038248 | 4/2005 |
| RU | 2 358 628 | 10/2008 |
| WO | WO-96/03717 | 2/1996 |
| WO | WO-02/069209 | 9/2002 |
| WO | WO-2007/148124 | 12/2007 |
| WO | WO-2008/124263 | 10/2008 |

OTHER PUBLICATIONS

Search Report dated Jul. 13, 2010, directed to GB Application No. 0916185.2; 2 pages.
Search Report dated Jul. 14, 2010, directed to GB Application No. 0916185.2; 4 pages.
Robertson, U.S. Office Action mailed Feb. 28, 2013, directed to U.S. Appl. No. 12/881,861; 10 pages.
Examination Report dated Dec. 12, 2013, directed to GB Application No. 0916185.2; 6 pages.

* cited by examiner

SYSTEM AND METHOD FOR IMAGE PROCESSING AND GENERATING A BODY MODEL

REFERENCE TO RELATED APPLICATIONS

This application is a divisional of U.S. patent application Ser. No. 12/881,861, filed Sep. 14, 2010, which claims the priority of United Kingdom Patent Application No. 0916185.2, filed Sep. 15, 2009, the contents of which prior applications are incorporated herein by reference.

FIELD OF THE INVENTION

The present invention relates to a system and method for image processing, for example obtaining alpha mattes of foreground objects, such as garments. The present invention also relates to a method of image adjustment for a body model image of a body model and to a method of generating a body model.

BACKGROUND OF THE INVENTION

Various image processing techniques exist which are used automatically to separate foreground objects from background objects in an image. Generally, this involves generating foreground transparency masks known as alpha mattes.

An alpha matte is an image which is the same size as the input image. Each pixel in the alpha matte has an alpha value which ranges from 0 to 1 representing the transparency of the foreground object within the pixel region, where "0" represents a pixel which is entirely part of the background and "1" represents pixels which are entirely part of the foreground. A particular type of an alpha matte is a binary alpha matte which has alpha values of only 0 or 1 which distinguishes foreground pixels from background pixels, but does not allow for partial opacity in pixels that overlap both foreground and background regions of the scene.

Existing techniques for generating alpha mattes are designed to work with foreground objects that are physically separate from the background. The foreground object must be positioned sufficiently far in front of the background that background and foreground lighting can be treated as independent.

Japanese patent application publication nos. 04037383, 11073491 and European patent application publication no. 1909493 describe conventional systems whereby a background planar object and a foreground object (of any shape), which are located at different distances from an imaging device, are discriminated from each other by illuminating the scene with different radiation frequencies. In all the systems described in the aforementioned documents, the foreground object must be positioned sufficiently far in front of the background so that background and foreground lighting can be treated as independent, thereby allowing the foreground portions to be distinguished from the background portions. Such systems do not permit foreground objects located near to and overlapping each other in the foreground part of the scene causing occlusion, to be readily discriminated from each other.

Outfit visualization tools are used by online clothing retailers to help shoppers see how specified combinations of garments might look on a real human body. Outfit visualization typically works by compositing one or more garment sprites onto an underlying image of a human body using alpha blending. A body image might be generated, for example, by projecting a 3D human body model into the desired viewpoint. Then suitable garment sprites could be obtained by (i) photographing the garments on a mannequin that has the same shape as the body model, and (ii) processing the resulting images to compute alpha mattes. Key challenges are:

1. to compute alpha mattes from garment photographs with a minimum of (costly) user intervention; and
2. to compensate for any misalignment between the mannequin and the body model. Alignment problems can arise because of slight variations in mannequin pose introduced by assembly and disassembly of the mannequin during dressing, variation in camera position, and because the mannequin can flex with time (under its own weight or that of heavy garments).

None of the existing techniques of generating alpha mattes is directly applicable to the problem of segmenting garment sprites from images of garments dressed on a mannequin.

In the context of garment imaging, each pixel in an image must be associated with an opacity (or alpha) value in the range 0 to 1 due to the translucence of certain garments when carried on a mannequin. Hence, it is desirable to obtain opacity information during alpha blending to give improved realism when compositing semi-transparent garments, especially in the vicinity of segmentation boundaries.

In the context of garment photography, the mannequin itself is deemed to be an unwanted background portion of the scene for the purposes of generating garment alpha mattes. However, the mannequin is not physically separate from the garment and, from the optical perspective of the imaging device, it is therefore part of the foreground when the garment is being imaged.

In the explanation which follows, all references to the "background" are references to portions of a scene which are located at greater distances from an imaging device than foreground portions, so that background and foreground lighting can be treated as independent. This imparts completely different considerations to those concerning the discrimination of wanted and unwanted portions of the scene foreground, which are an aspect of the present application. The most popular alpha matting strategies discussed below.

Constant Colour Matting

Here the foreground object is photographed against a backdrop with a known, constant colour—ideally one that is in some sense distinct from those in the foreground object. Then the alpha value at each pixel is computed by measuring the amount of background colour that shows through the foreground object (this is also known as blue screen, green screen, and chromakey matting). Well-known limitations of this approach include:

1. the backdrop colour can introduce an unnatural colour cast to the foreground object (colour spill); and
2. if the foreground colours are insufficiently distinct from the background colour (e.g. because of colour spill or shadows cast on the background by the foreground object) then it may be difficult to segment the foreground sprite cleanly.

In principle, it would be possible to extend this idea to the garment matting problem by using a mannequin with the same colour as the backdrop. However the lack of physical separation between the mannequin and the garment exacerbates the problems of colour spill and background shadow to such an extent that it is often impossible to obtain an alpha matte that can fully separate the foreground and background layers. Furthermore, garments come in a variety of colours, which complicates the task of choosing a single background colour that is sufficiently different to that of the mannequin for segmentation to be successful.

Multi-Film Matting

Here, a foreground object is painted with a special paint, typically one that is transparent to visible light but which fluoresces strongly at a particular wavelength in response to UV illumination. Then the scene is photographed with a camera sensitive to the wavelength at which the paint fluoresces as well as another camera that is sensitive to visible light. The image obtained by the first camera can be used directly as an alpha matte. This technique could not be applied to garment matting since it is not possible or desirable to dye garments with an appropriate fluorescent dye.

Triangulation Matting

Here, the foreground object is photographed two or more times against backdrops of different, known colours. Then the alpha matte is determined by measuring the colour change at each pixel (more opaque foreground pixels exhibit less colour change).

Generating a three-dimensional body model of a subject from a limited set of body measurements taken from the subject, or from a two-dimensional image of the subject is also key to providing an accurate fit of a garment to a subject. This also permits an accurate visualisation of the garment on an image of the subject. There are currently no accurate processes or systems for achieving accurate generation of a body shape and its corresponding surface geometry.

SUMMARY OF THE INVENTION

The present invention is defined by the appendant claims and aims to solve the aforementioned problems.

A method and system is provided by the present invention for automatic computation of garment alpha mattes from images (including video frames) of garments worn on a mannequin. The system and method of the invention measures the attenuation of the garment fabric of light between points on the surface of the mannequin or backdrop and the camera. The invention permits alpha mattes to be generated with a background that comprises not only a plane surface, but also of objects in the foreground, such as a special mannequin. A feature of this aspect of the invention is that the surface of the foreground object (e.g. a mannequin) can emit or retroreflect light.

In a first aspect of the present invention, there is provided a method for generating an image of an object in a scene, comprising:

emitting or retroreflecting electromagnetic radiation having a first spectral power distribution from a surface of a first foreground object, which is adjacent or at least partially obscured by a second foreground object;

acquiring a first image of both the first and second foreground objects whilst the first foreground object retroreflects or emits electromagnetic radiation with the first spectral power distribution;

acquiring a second image of the first and second foreground objects whilst the first foreground object is not retroreflecting or emitting electromagnetic radiation, or is retroreflecting or emitting electromagnetic radiation with a second spectral power distribution which is different to the first spectral power distribution;

generating an image of only the second foreground object by comparing of the first image and second image.

The spectral power distributions may be different in the sense that their spectral power distributions (e.g. wavelengths ranges) may be different, may overlap, may not overlap, may be separated from each other.

In the context of the present invention, the terminology "foreground" refers to objects or pixels which are foreground objects or pixels from an optical perspective, i.e. they are contained in the foreground part of the scene and relate to objects that are closely located in this part of the scene. The foreground objects may be adjacent each other, or even part of the same object being imaged, even though one part of the foreground object may be unwanted. The foreground objects may be occluding. The foreground objects may non-planar (a background object may be planar). The foreground objects may be juxtaposed, overlapping or close to each other in a plane which is perpendicular to the optical axis of the imaging device directed at the scene, or in such planes which are close to each other within a certain range along the optical axis of the imaging device directed at the scene.

All of this is completely different to the conventional distinction between foreground objects and background objects in a three-dimensional scene, in which a background object (most likely a planar backdrop) would normally be located behind the foreground object at some distance away from the foreground object.

In the context of the present invention the word "close", means that the objects may be separated by less than 2, 1, 0.5, 0.4, 0.2, 0.1, 0.05, 0.04, 0.03, 0.02, 0.01, 0.005 or 0.001 meters. Objects may be defined as being in the "foreground" when they are both located within a particular range of distances from each other in a direction along an axis from the imaging device. This range may be less than 2, 1, 0.5, 0.4, 0.2, 0.1, 0.05, 0.04, 0.03, 0.02, 0.01, 0.005 or 0.001 meters. Conversely, a corresponding distinction between foreground and background objects may be such that their separation in distance along an axis joining the foreground and background objects to the imaging device may be greater than 2, 1, 0.5, 0.4, 0.2, 0.1, 0.05, 0.04, 0.03, 0.02, 0.01, 0.005 or 0.001 meters The present invention permits different parts of objects in the foreground of a three-dimensional scene to be distinguished from each other. This is very different to conventional systems and processes from the prior art which distinguish between one foreground object or a group of foreground objects, and a planar background located some distance away from the foreground object(s) and behind the foreground object(s) (with respect to the imaging device).

In the context of the present application, "emitting" means that electromagnetic radiation is actively exuded from an object or surface, as opposed to reflected. When the first foreground object is not emitting light, it will be appreciated that it may continue to reflect light from external illumination of the scene. However, this reflected light on its own is scattered by the first foreground object and does not provide an even frequency and/or brightness distribution over the surface of the first object to be used in distinguishing the second foreground object from the first foreground object. An alternative solution is to cause electromagnetic radiation to be retroreflected from the surface of the first object at two different spectral power distributions. Retroreflection causes light to be reflected back along the same direction from which it originated, rather than being scattered. An even distribution of reflected light can be obtained by having a retroreflective coating on the surface of the first foreground object. The coating may be retroreflective paint or other such material.

In one embodiment of the invention, the step of generating an image comprises generating an alpha matte of the first and second foreground objects based on a comparison of the first image and second image.

It will be appreciated that the term "image" refers to the image of the scene in whatever form it is acquired, for example the image may be embodied as a data file containing data for each pixel in the image, e.g. a 3-vector representing the red-green-blue values for each pixel.

The step of generating the alpha matte may comprise measuring and comparing the colour variation between corresponding pixels in the first image and second image. Alternatively, the step of generating the alpha matte may comprise measuring and comparing the brightness of corresponding pixels in the first image and second image.

Preferably, the step of generating the alpha matte comprises subtracting colour vectors of pixels in the second image from colour vectors of corresponding pixels of the second image, or vice-versa. Each pixel vector is preferably a 3-vector of RGB values, although other known vector notations for representing colour, brightness, hue and/or saturation of image pixels may be used. Corresponding pixels are pixels located in the same image location in the first image and second image.

Preferably, the first image and second image are acquired from identical locations by an image acquisition device having a fixed location.

In a general sense, the alpha matte is preferably data which is a representation of whether a pixel is a desired foreground pixel or an unwanted foreground pixel. Furthermore, the alpha matte may comprises data representative of the opacity of a desired foreground pixel with respect to an unwanted foreground pixel.

In one embodiment of the invention, the first foreground object is coated in a fluorescent coating which is responsive to ultra violet light, wherein the step of emitting electromagnetic radiation at a first spectral power distribution comprises illuminating the first foreground object with ultra violet radiation from an ultra violet light source so that the first foreground object is caused to emit light. Ultra-violet light is defined as electromagnetic radiation having a wavelength substantially in the range of 10 nm to 400 nm.

Preferably, the first and second images are acquired with an image acquisition device and the ultra violet light source emits ultra violet light from a location which is located less than 100, 50, 25, 10, 5, 4, 3, 2, or 1 centimeters from the optical centre of the image acquisition device. The image acquisition device may be a digital camera and the ultra violet light source may be an ultra violet light which is fixed to or integrated with the digital camera. The light source and digital camera are directed in substantially the same direction towards the scene.

Preferably, the step of acquiring a second image is carried out when the first foreground object is not being illuminated with ultra violet light from the ultra violet light source. The ultra violet light source may be controllable in conjunction with the image acquisition device so that, when acquiring one of the first image or the second image, the ultra violet source is emitting ultra violet light and when acquiring the other of the first image or second image, it is not emitting ultra violet light.

In an alternative embodiment of the invention, the step of emitting electromagnetic radiation at a first spectral power distribution comprises generating the electromagnetic radiation within the first foreground object so that the surface of the first foreground object emits electromagnetic radiation from its surface, wherein the electromagnetic radiation is generated within the first foreground object at a second spectral power distribution for acquisition of the second image.

Preferably, the first foreground object comprises a semi-translucent outer shell and a radiation source inside the shell which is adapted to generate electromagnetic radiation having two different spectral power distributions. Preferably, external illumination of the first and second foreground objects is substantially identical during acquisition of the first and second images. There may be a controllable light source within or on the first foreground object, wherein the controllable light source is adapted to emit electromagnetic radiation at a first spectral power distribution so that the surface of the first foreground object emits electromagnetic radiation from its surface for acquisition of the first image, and wherein the controllable light source is adapted to emit electromagnetic radiation within the first foreground object at a second spectral power distribution for acquisition of the second image. The light source may be controllable in conjunction with the image acquisition device so that when acquiring one of the first image or the second image, the light source is emitting light at a first spectral power distribution and when acquiring the other of the first image or second image, it is emitting light at a second spectral power distribution, which is different to the first spectral power distribution.

In one embodiment of the invention, the first foreground object is a mannequin and the second foreground object is an item of clothing.

The electromagnetic radiation may be visible light or may be ultra-violet light in the case where the first foreground object is responsive to ultraviolet light.

In one embodiment of the invention, the method comprises extracting an image sprite of an item of clothing by applying the generated alpha matte to one of the first or second images. Alternatively, the image acquisition device may acquire a third image of the scene without the first foreground object being illuminated and the alpha matte may be applied to this third image. By "applying", it is meant that the alpha values for pixels of the alpha matte are applied (e.g. multiplied) to corresponding pixels of the image to impart a degree of opacity to an output image based on the opacity of pixels in the alpha matte represented by the alpha values. Hence, in one embodiment, completely opaque pixels (i.e. transparent pixels) from the alpha matte, when applied to corresponding pixels in the image, result in the pixels from the image being replicated in their entirety in the image sprite without any change in the pixel values. Partially opaque pixels from the alpha matte result in modification of corresponding pixel values of the image and non-opaque (i.e. dark pixels) of the alpha matte result in corresponding pixels not being replicated from the image, with corresponding pixels in the resulting image sprite being designated as opaque or transparent so that when the sprite is overlaid on an underlying image, these pixels of the image sprite (corresponding to unwanted parts of the scene) are not displayed.

The method may comprise overlaying the image sprite onto a body image, and may further comprise warping the image sprite to match the form of a body in the body image.

In a second aspect of the present invention, there is provided a system for generating an image of a foreground object in a scene, comprising:

a first foreground object adapted to emit or retroreflect electromagnetic radiation having a first spectral power distribution from its surface;

a second foreground object which is adjacent or at least partially obscured by the first foreground object;

an image acquisition device configured to acquire a first image of the first and second foreground object whilst the first foreground object emits electromagnetic radiation with the first spectral power distribution, and a second image of the first and second foreground objects whilst the first foreground object is not emitting electromagnetic radiation or is emitting or retro reflecting electromagnetic radiation with a second spectral power distribution which is different to the first spectral power distribution; and a processor in communication with the image acquisition device and configured to generate an image of only the first foreground object based on a comparison of the first image and second image.

The system may comprise an ultra violet light source which is adapted to illuminate the first foreground object with ultra violet radiation for acquisition of the first image, wherein the first foreground object is coated in a fluorescent coating which is responsive to ultra violet light. Preferably, the ultra violet light source emits ultra violet light from a location which is located less than 100, 50, 25, 10, 5, 4, 3, 2, or 1 centimeters from the optical centre/axis of the image acquisition device.

The first foreground object may comprise a semi-translucent outer shell. The first foreground object may be a mannequin and the second foreground object may be an item of clothing.

In a third aspect of the invention, there is provided a mannequin having an external surface for carrying garments, comprising:

emitting means adapted to emit electromagnetic radiation from the external surface with a first spectral power distribution, wherein the emitting means is adapted to be controllable to emit electromagnetic radiation with a second spectral power distribution which is different to the first spectral power distribution.

Preferably, the emitting means is a controllable light source contained within the mannequin, wherein the mannequin is formed of translucent, or semi-translucent, material.

In a fourth aspect of the invention, there is provided a mannequin having an external surface for carrying garments, comprising:

emitting means adapted to emit electromagnetic radiation from the external surface with a first spectral power distribution when illuminated with ultra-violet light.

The emitting means may be a fluorescent surface or coating on the external surface.

In a fifth aspect of the invention, there is provided a computer program product comprising computer executable instructions, which, when executed on a computer, cause the computer to generate an image of a foreground object based on a comparison of a first image and second image, wherein the first image of first and second foreground objects is acquired whilst the first foreground object emits or retroreflects electromagnetic radiation with a first spectral power distribution, and the second image of the first and second foreground objects is acquired whilst the first foreground object is not emitting electromagnetic radiation or is emitting or retroreflecting electromagnetic radiation with a second spectral power distribution which is different to the first spectral power distribution, wherein the computer executable instructions further comprise In a seventh aspect of the present invention, there is provided a method of generating a body model, comprising:

(i) defining at least one body model control point and/or measurement on at least one standard body model;

(ii) generating a subject body model by defining at least one subject control point and/or measurement corresponding to each body model control point and/or measurement in a subject body model corresponding to a subject body.

Hence, according to the present invention, very accurate subject body models for real life subjects can be obtained starting from a standard body model and having equivalent control points on both the standard body model and the subject model.

The terminology "body model" in the context of the present application means data that represents body shape. This model can then be used to project a two-dimensional image of a body from a particular location in a three-dimensional scene. The terminology "control point" in the context of the present application means a point on one body model which has an equivalent position in another body model, e.g. the tip of the knee or elbow joints, the point at which the hips extend to their maximum extent, the base of the spine, the base of the neck, and many others etc. The terminology "control measurement" in the context of the present application means a body measurement (of a real-life body or of the body model) which is not defines by a measurement at a single point, or between two points.

The body model may be a three-dimensional representation of body geometry.

Preferably, step (ii) further comprises step iii) of generating a subject mapping of each body model control point and/or measurement to its corresponding subject control point or measurement. The term "mapping" may include a vector-based transformation of standard body model data to subject body model data.

Preferably, step (ii) comprises manipulating standard body model data based on the mapping to generate subject body model data, thereby generating the subject body model.

In one embodiment of the invention, prior to step (i), there may be the step of generating at least one predefined body model. The method may further comprise the step of generating a plurality of predefined body models.

The step of generating each predefined body model may comprise:

acquiring predefined measured data of at least one predefined body;

generating at least one predefined mapping of each standard body model control point to a corresponding predefined control point on the predefined body model based on the predefined measured data; and storing the at least one predefined mapping in memory.

The predefined body may be one of a number of test bodies used for the provision of predefined measured testing data. The test bodies may be a sample of bodies taken from a population sample.

A plurality of predefined mappings of each standard body model control point to a corresponding predefined control point on predefined body models based on the predefined measured data of predefined bodies, may be generated.

Step (ii-1) may further comprise:

acquiring subject measured data of a subject body; and determining the at least one subject mapping by performing a regression algorithm based on the subject measured data and the at least one predefined mapping.

In an eighth aspect of the invention, there is provided a method of generating a real life body model image, comprising:

defining at least one body model control point on a body model image;

defining a subject control point for each body model control point in a subject image of a real life subject;

generating a mapping of each body model control point to its corresponding subject control point;

manipulating pixels of the body model image based on the mapping so that pixels in the body model image align with pixels in the subject image, thereby generating a manipulated real life body model image.

Preferably, the method comprises overlaying a garment image sprite on the manipulated real life body model image.

In a seventh aspect of the present invention, there is provided a method of image adjustment for a body image of a body model, comprising:

defining at least one sprite control point in a garment image sprite;

defining, in the body image, at least one output control point corresponding to each sprite control point;

generating a mapping of each sprite control point to each output control point;

manipulating pixels of the image sprite based on the mapping so that pixels in the image sprite align with pixels in the body image, thereby generating a manipulated image sprite; and overlaying the manipulated image sprite onto the image of the body model to generate an output image.

Preferably, the step of defining at least one sprite control point comprises obtaining each sprite control point from an image of the garment in the garment image sprite overlaid on a mannequin for which there are pre-defined mannequin control points.

In further aspects of the invention, there are: a computer program product comprising computer executable instructions which, when executed on a computer, cause the computer to perform the steps of the preceding method; and an apparatus comprising a processor configured to perform the steps of the preceding method.

BRIEF DESCRIPTION OF THE DRAWINGS

The present invention is now described by way of example with reference to the accompanying drawings, in which:

FIG. 4 shows, in accordance with the first aspect of the invention, steps that are performed by the system of FIG. 1a.

DETAILED DESCRIPTION OF THE DRAWINGS

The present invention is described below with reference to foreground objects being a mannequin and a garment. However, it will be appreciated that the principal of the invention could be applied to any situation where two foreground objects are to be distinguished from each other.

Figure 1A:
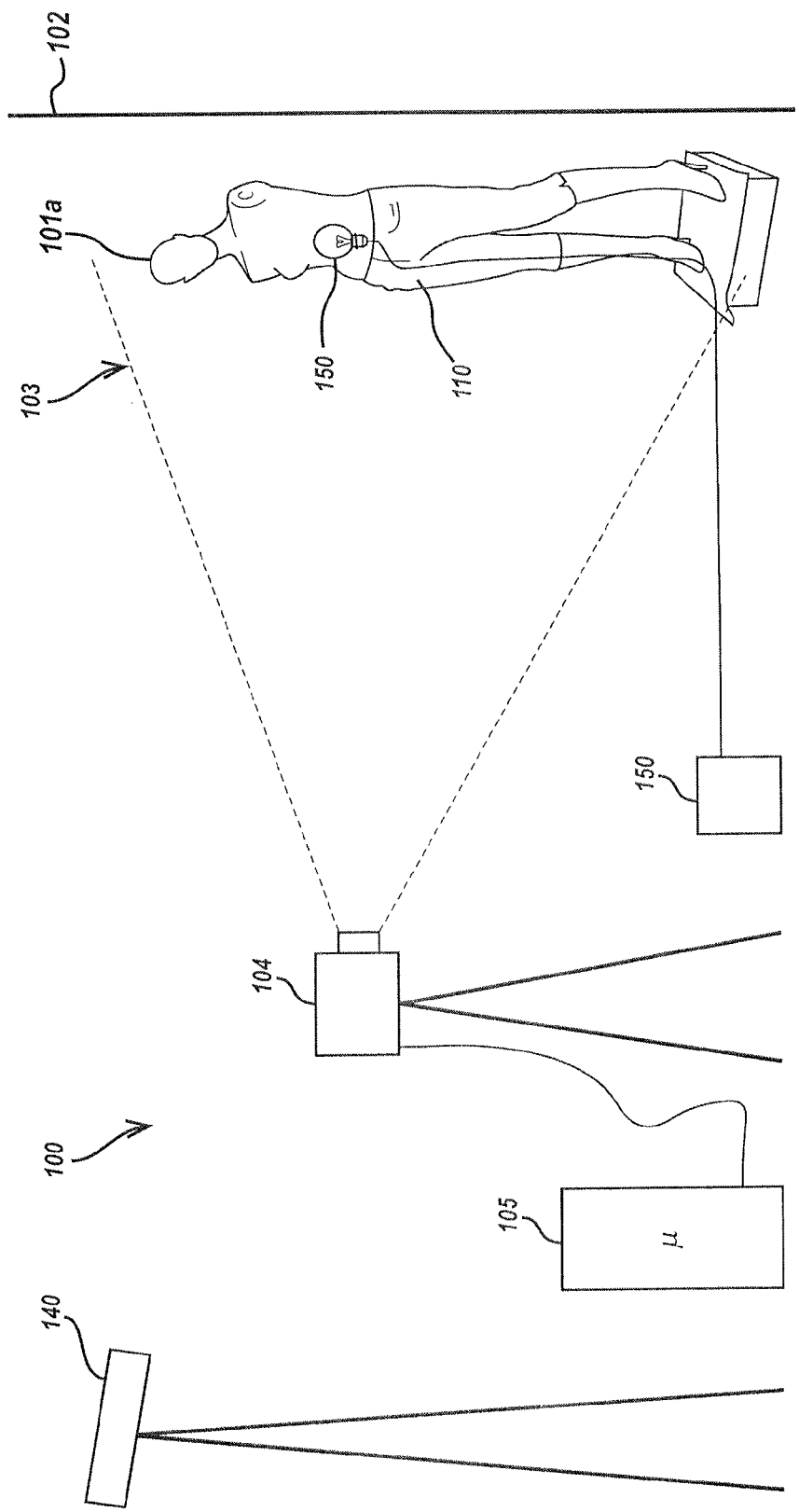
FIG. 1a shows, according to a first aspect, a system for performing the present invention according to a first embodiment of the present invention.

FIG. 1a shows a system 100 for performing the present invention according to a first embodiment. The system 100 comprises a foreground object, preferably a mannequin 101a which is positioned in front of a backdrop 102, forming a scene 103. The mannequin is dressed in at least one garment 110. An image or video capture device, preferably a digital camera 104, is positioned in front of the mannequin 101 and backdrop 102 so that original digital images of the scene 103 can be obtained. Each original digital image is transmitted to a processing device 105 connected to the digital camera 104. The processing device 105 carries out image processing steps in accordance with the present invention on the original digital images to generate an alpha mattes of the garment, or a garment image sprite (i.e. a digital image of the garment 110 on its own). In FIG. 1a, the mannequin 101a is a light-generating mannequin. The mannequin is formed of translucent, or semi-translucent, material and contains a controllable light generator 150 which can be controlled to emit light having at least one of two different spectral power distributions. Studio lighting 140 is also used to illuminate the scene 103 with visible light, when required.

Figure 1B:
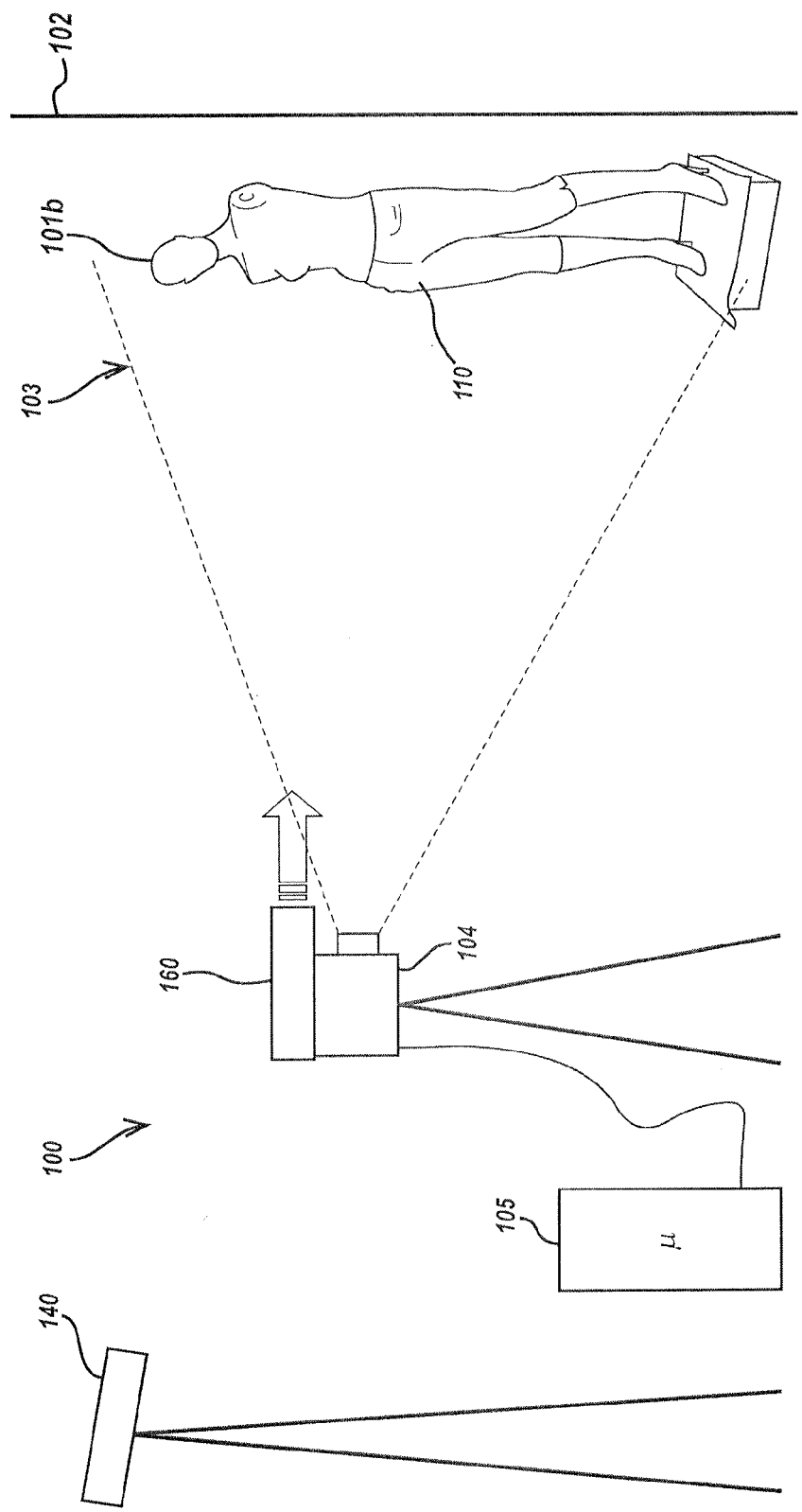
FIG. 1b shows, according to the first aspect, a system for performing the present invention according to a second embodiment of the present invention.

FIG. 1b shows the system 100 for performing the present invention according to a second embodiment. The mannequin 101b is an ultra-violet light-responsive mannequin which is formed of material which contains or is coated with a light-responsive emitting material 151, such as a fluorescent material. Such a fluorescent material may be responsive to non-visible ultra-violet light generated by the ultra-violet light source 160, so that the mannequin 101b emits visible light in a particular spectral power distribution when illuminated with the ultra-violet light.

Figure 2:
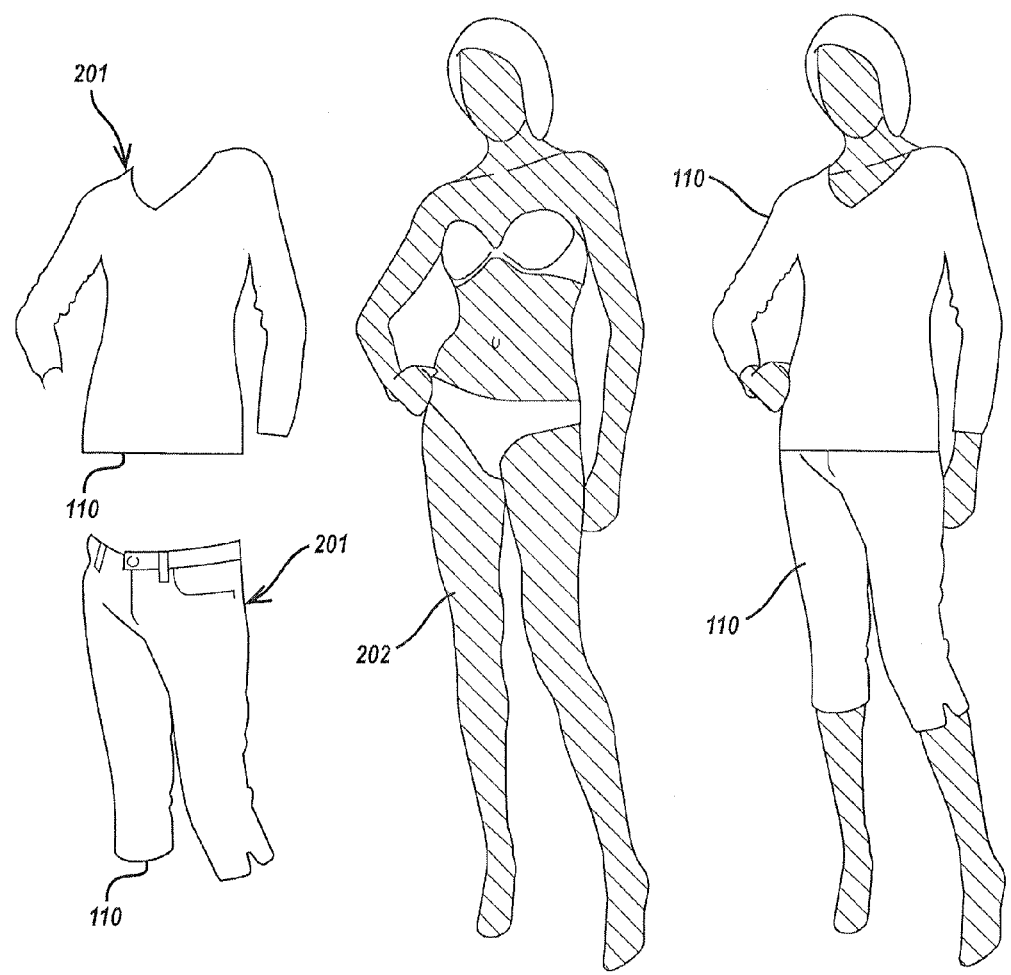
FIG. 2 shows how garment sprites are composited onto an underlying human body image using alpha blending.

FIG. 2 shows how a garment image sprite 201 is composited onto an underlying human body image 202 using alpha blending. This may be performed by the processing device 105 or a separate processing device located separate or remote from processing device 105.

Figure 3:
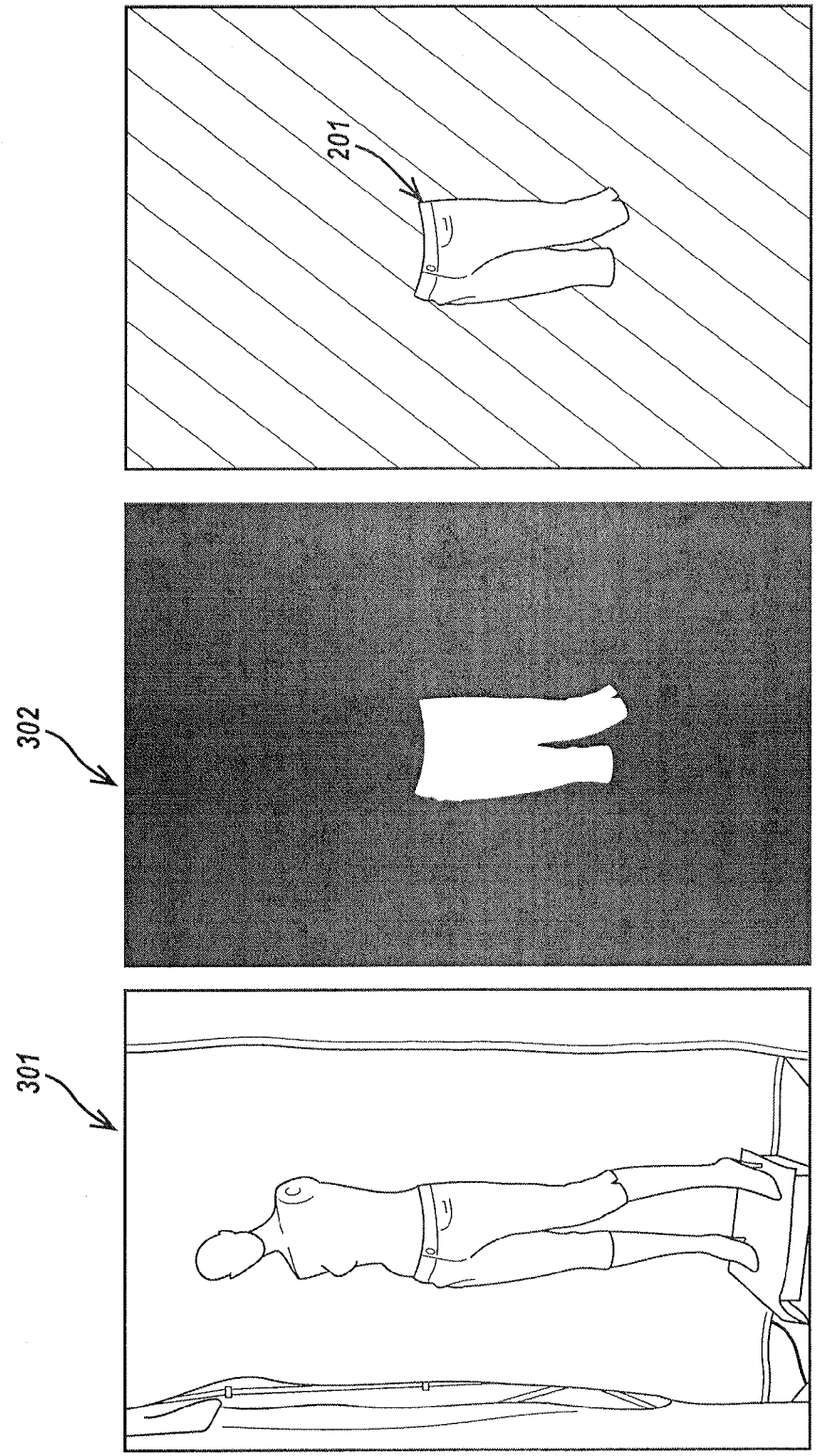
FIG. 3 shows how an alpha matte is used to extract a sprite that can be composited over an arbitrary background image.

FIG. 3 shows how the garment 110 is extracted into a garment image sprite 201 from a digital garment photograph 301. An alpha matte 302 is generated in which pixel intensity is proportional to the opacity of the foreground (garment) layer (where white is fully opaque). This alpha matte 302 is used to extract a sprite 201 that can be composited over the human body image 202 (or indeed any arbitrary background image).

In the photograph 301 containing a foreground object (garment 110) in front of a background (i.e. adjacent foreground objects, such as the mannequin 101a/b, and backdrop 102), the process of image formation can be modelled mathematically using an alpha blending equation as follows:

$$o = \alpha f + (1-\alpha)b \tag{1}$$

where o is the colour of one pixel in the image of the observed scene 103, f is the colour of the desired foreground object at that pixel location, b is the colour of the unwanted foreground and backdrop at that pixel location, and α is a measure of the transparency of the foreground object at that pixel (which determines how much of the background colour (including unwanted foreground objects and backdrop) is visible in the observed image).

In what follows, it should be assumed that colours o, f, and b are modelled by 3-vectors representing red-green-blue (RGB) colour values, e.g. $o=[r_o \, g_o \, b_o]'$.

Given an observed image O of such the scene 103, two image layers: a foreground layer F with an associated image A containing the transparency information (an alpha matte) and a background layer B (including unwanted foreground objects and backdrop). The recovered foreground F image in combination with the alpha matte (a four channel colour-plus-transparency) image is known in the computer graphics community as a sprite.

In the case where one desired foreground object is a garment and the background includes a foreground object which is a mannequin 101a/b, it cannot be assumed that the background colour is known precisely at each pixel. The reason is that the non-planar shape (and possibly the inconsistent pose) of the mannequin means that the background colour can vary significantly throughout the image. However, by obtaining multiple exposures of the stationary scene with different background illumination, the change in the colour of background pixels from image to image can be used to facilitate computation of the alpha matte and foreground sprite.

Mathematically, the multiple exposures are modelled as follows:

$$o_1 = \alpha f + (1-\alpha)b_1 \quad (2)$$

$$o_2 = \alpha f + (1-\alpha)b_2 \quad (3)$$

where $o_1$ is the colour observed at a given pixel with background illumination $b_1$ (of the unwanted foreground object and backdrop), and so on. Then, the mannequin and garment are imaged with two different known background lighting configurations having different spectral power distributions, e.g. ultra-violet light (10 to 400 nm) and visible light (in a range of 400-750 nm), or green light (in a range of 495-570 nm) and blue light (in a range of 450-495 nm). Then subtracting (2) and (3) we get:

$$o_1 - o_2 = (1-\alpha)(b_1 - b_2) \quad (4)$$

which gives (taking the magnitude of both sides):

$$\alpha = 1 - \text{magnitude}(o_1 - o_2)/\text{magnitude}(b_1 - b_2) \quad (5)$$

which represents the values for each pixel in the alpha matte 302.

Finally, for each given non-zero α, foreground pixel colours f of the desired foreground object only can be computed by substitution for each pixel into (1) from a known image O of the scene 103 based on an estimation of the background colour, e.g. by estimating a background colour, for example by basing it on the illumination provided in the first or second images. Even an approximate estimate of one background colour b will allow a sufficiently good estimate of foreground colour f to allow the recovered sprite to be composited over a new background image. Given an inaccurate estimate b=b+ε of the true background colour b, the foreground colour can be computed as follows:

$$f = [o - (1-\alpha)b]/\alpha \quad (a)$$

In practice, this equation is singular for α=0 and a foreground colour value with premultiplied opacity, i.e. αf. In a typical application, the recovered foreground colour f for each pixel would be used directly to composite the sprite over a new background image as follows:

$$c = o = \alpha f + (1-\alpha)b' \quad (b)$$

where b' is the colour of the new background pixel, and c is the colour of the pixel in the composite image.

The consequence of an error ε in the background colour estimate at the given pixel location is to add (1−α)·ε to the composite colour c. This error will be most in evidence in image regions where α is significantly less than one, typically in the vicinity of garment edges. However, the problem can be ameliorated by setting c=b' wherever α is small and/or refining our strategy for predicting α by exploiting the intuition that foreground colour is "smooth"; that is evidence provided by nearby pixels can be used to help infer the uncertain foreground colour at garment edges.

Two embodiments of the invention which are performed by the system of FIG. 1 are described below. In both embodiments, the garment 110 is dressed onto either the mannequin 101a of FIG. 1a or the mannequin 101b of FIG. 1b and positioned in front of the backdrop 102.

Figure 4:
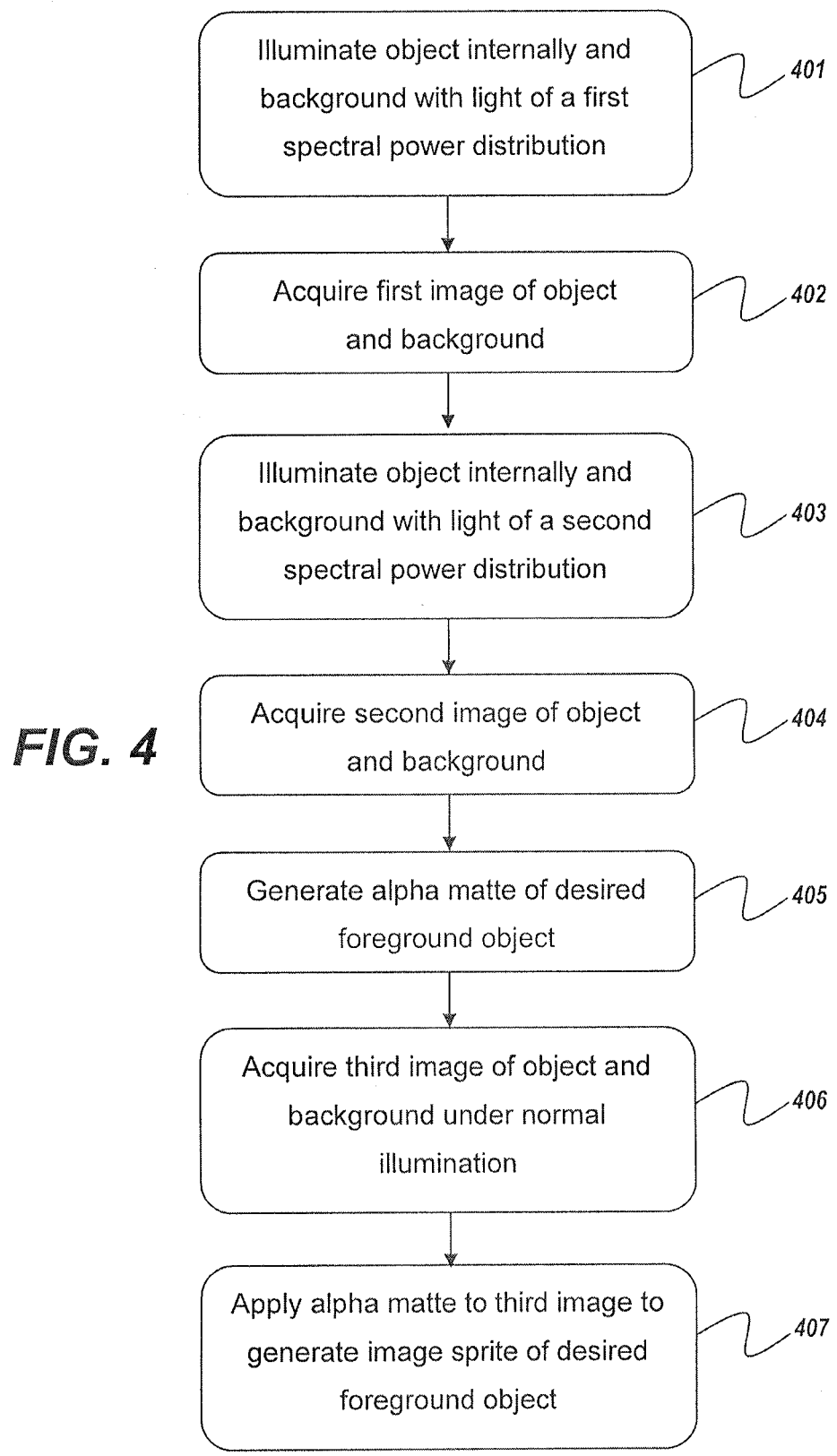

With reference to FIG. 4, in a first embodiment of the invention, the following steps are performed.

In step 401, the mannequin 101a is illuminated internally such that its surface can be made to emit light with a first spectral power distribution. The mannequin 101a is constructed from a semi-translucent plastic shell equipped internally with the (coloured) controllable light generator 150. The mannequin 101a and garment 110 are also illuminated externally by standard studio lighting 140. The backdrop 102 is illuminated such that it has the same colour as the mannequin 101a.

In step 402, the scene 103 is photographed by the camera 104 with constant external illumination to generate a first digital image.

In step 403, the mannequin 101a is illuminated internally such that its surface can be made to emit light with a second spectral power distribution. Again, the backdrop 102 is illuminated such that it has the same colour as the mannequin 101a.

In step 404, the scene 103 is photographed by the camera 104 with the constant external illumination to generate a second digital image.

It is important the mannequin 101a and camera 104 are not moved during the aforementioned process so that pixels in the digital images correspond.

In step 405, the processing device 105 receives the digital image and processes them to generate an alpha matte 302. The alpha matte 302 is determined from the first and second digital images by measuring the colour variation at each pixel between the first and second images to generate a difference image (see above with reference to FIG. 3). More opaque foreground pixels are less likely to change colour due to background colour variation. Hence, the alpha matte is a representation of the opacity of the desired foreground object.

Finally in step 406, an image of the scene, with no illumination of the mannequin 101a, is acquired. The alpha matte is overlaid over this image by the processing device 105 to filter out any aspect of the scene which is not part of the garment 110, thereby generating a garment image sprite.

As a final step (not shown in FIG. 4), when the obtained garment image sprite 201 is overlaid on an image of an actual human body model, any slight misalignment between the mannequin 101a and the body model can corrected using image warping (see below).

Figure 5:
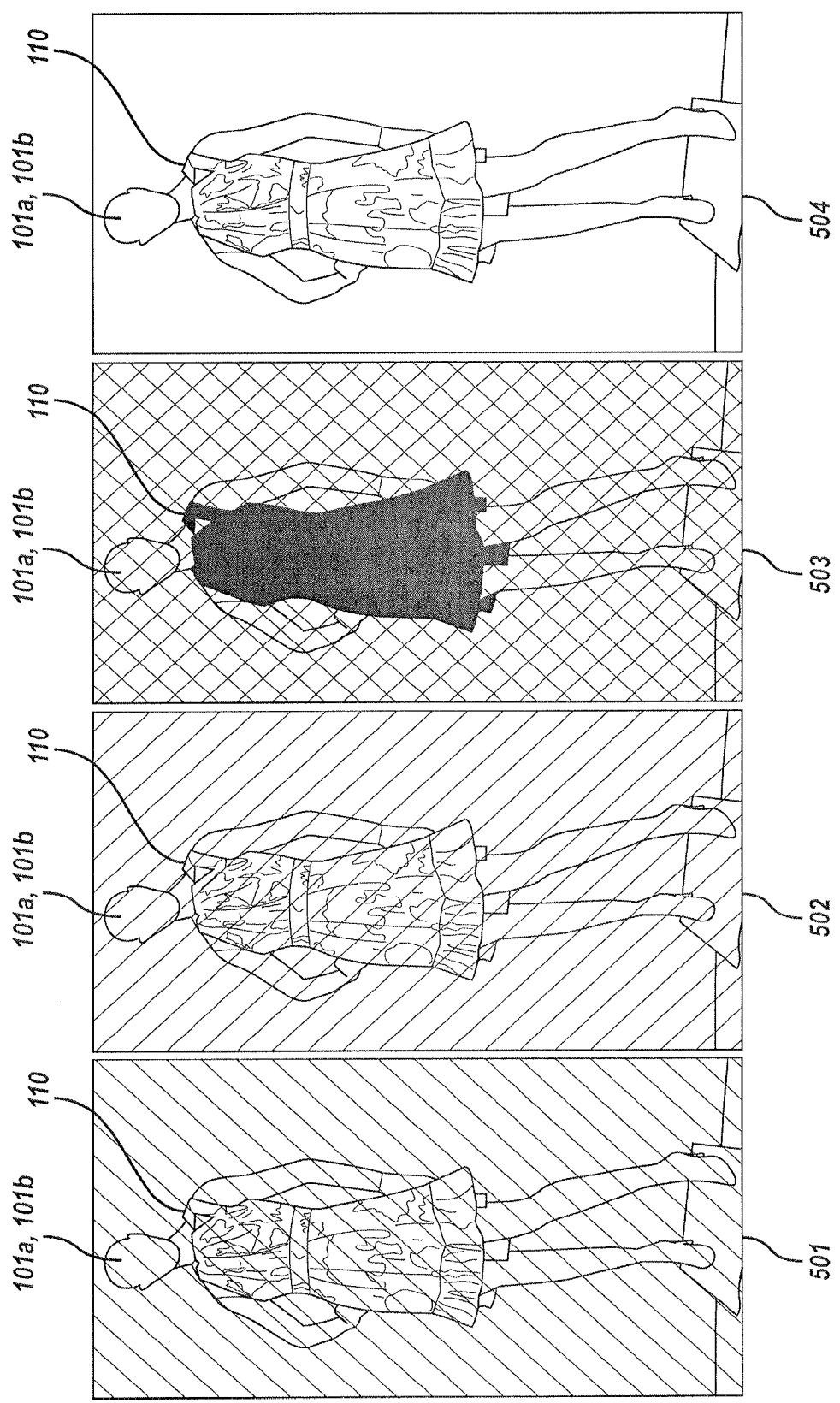
FIG. 5 shows images that are obtained according to the embodiment of FIG. 4.

FIG. 5 shows a garment being photographed separately with a (i) green, and (ii) blue coloured mannequin and backdrop lighting to obtain first and second images 501, 502. A difference image 503 is calculated by the processing device 105 from the first and second images 501, 502 that are obtained. As illustrated by the difference image 503, the colour change at each pixel of the garment pixels is related to the desired alpha value (the darkest pixels correspond to garment). This difference image 503 is used to extract an alpha mattes for the garment based on a pre-defined darkness of pixels. A third image 504 of the garment 110 and mannequin 101 is obtained under ordinary white lighting. The alpha mattes is then used as a filter and overlaid on the third image 504 to obtain the garment image sprite 201 of the garment 110.

Figure 6:
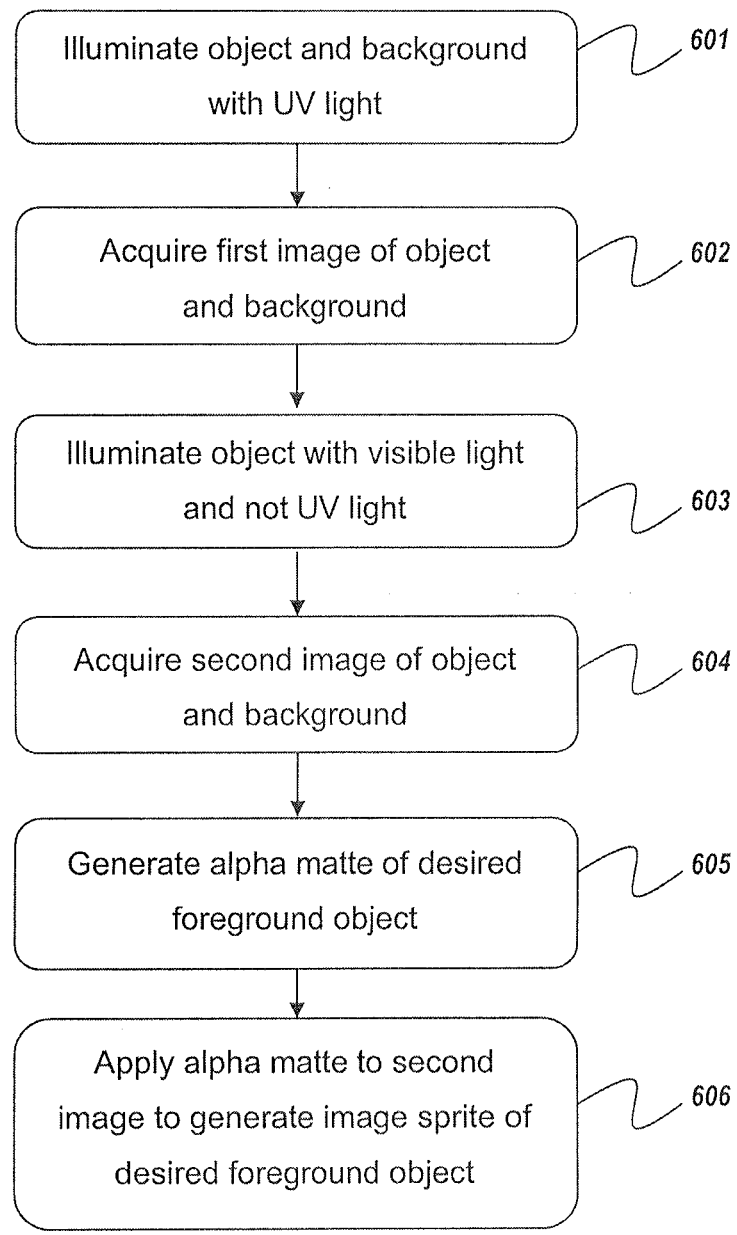
FIG. 6 shows, in accordance with the second aspect of the invention, steps that are performed by the system of FIG. 1b.

With reference to FIG. 6, in a second embodiment of the invention, the following steps are performed.

The mannequin 101b and backdrop 103 are coated with a special fluorescent coating that is invisible under visible light, but emits light of one or more known wavelengths when illuminated by ultra-violet (UV) light.

In step 601, the mannequin 101b and backdrop 102 are photographed by the camera 104 under illumination by the UV light source 160 to obtain a first digital image. Under UV illumination, portions of the mannequin 101b that are exposed to the UV light source 160 glow brightly (with a spectral power distribution that is characteristic of the fluorescent coating), but portions that are occluded from the UV light source 160 by the garment 110 do not. The reduction in intensity is a consequence of light attenuation by the garment fabric. The fabric attenuates both (i) UV light rays travelling from the light source towards the surface of the mannequin 101b or backdrop 102b (which reduces the excitation of the fluorescent paint) and (ii) light rays travelling from the (fluorescent) surface of the mannequin 101b to the camera 104. By positioning a point UV light source as close as possible to the optical centre of the camera, it is ensured that portions of the mannequin 101b and backdrop 102b that are visible from the camera's viewpoint receive maximal UV exposure, and, conversely, that portions of the mannequin that are occluded from the camera's viewpoint (by garment fabric) receive less UV exposure. So as to minimize UV exposure from reflected UV light, the walls of the photographic studio are coated with a material that absorbs UV radiation.

In step 602, the mannequin 101b is imaged by the camera 104 separately under visible light only (with the UV light source 160 turned off) to obtain a second digital image. For this step, the standard studio lights 140 can be positioned at will so that the garment is photographed to best effect. However, so that pixels in the first digital image correspond to pixels in the second digital image, it is important the mannequin 101b and camera 104 do not move during the intervening time period.

The processing device 105 then uses a combination of cues to compute the desired alpha matte, including the change in colour at each pixel when the UV illumination is turned on and off. By ensuring that the mannequin 101b and camera 104 remain in a fixed position, the alpha matte can be used directly to extract a garment sprite from the resulting image, for example by overlaying the alpha matte over the second digital image.

As a final step (not shown in FIG. 6), when the obtained garment image sprite 201 is overlaid on an image of an actual human body model, any slight misalignment between the mannequin 101a and the body model can corrected using image warping (see below).

Figure 7:
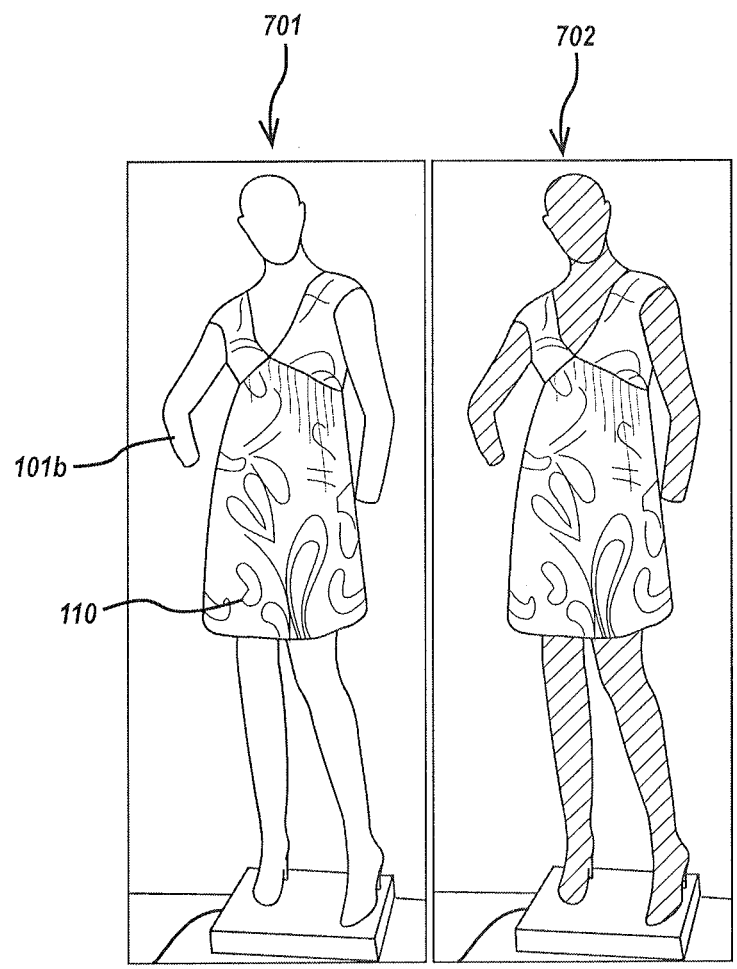
FIG. 7 shows images that are obtained according to the embodiment of FIG. 6.

FIG. 7 shows a garment 110 on the mannequin 101b being photographed separately under (i) UV, and (ii) visible lighting to obtain first and second images 701, 702. These images can be subtracted by subtracting the pixel colours of corresponding pixels in the images (i.e. pixels in the same image location) to generate a difference image in the same way as described with reference to FIG. 3 (see equation (4) above) so that an alpha matte can be generated (see equation (5)).

Figure 8:
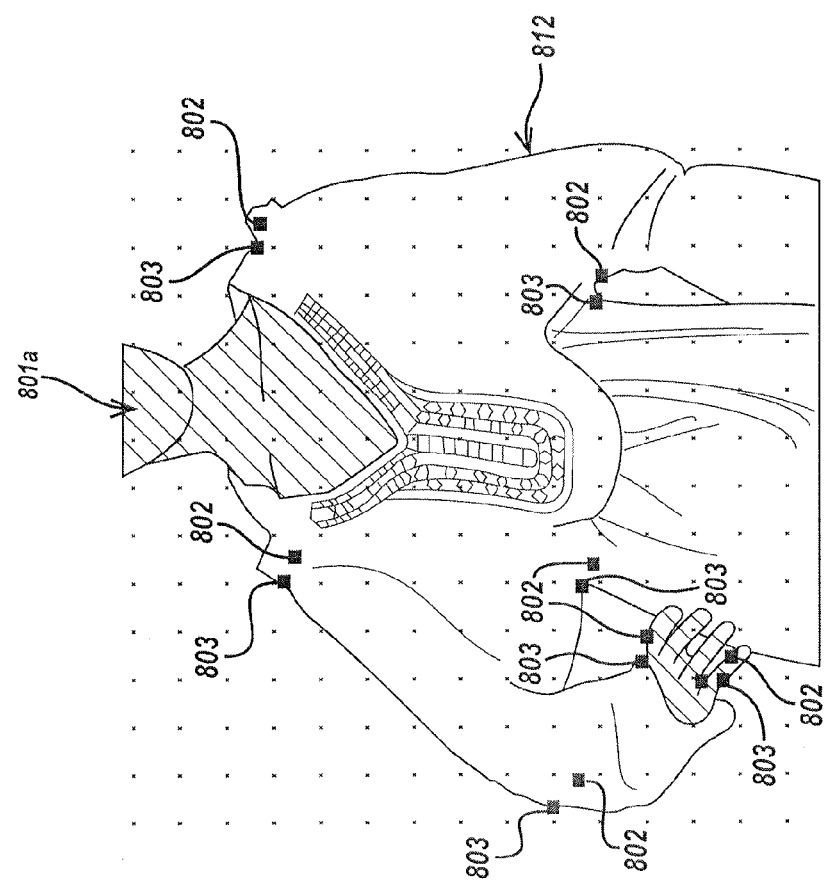
FIG. 8 shows how images are mapped to each other according to a second aspect of the invention.
Figure 8:
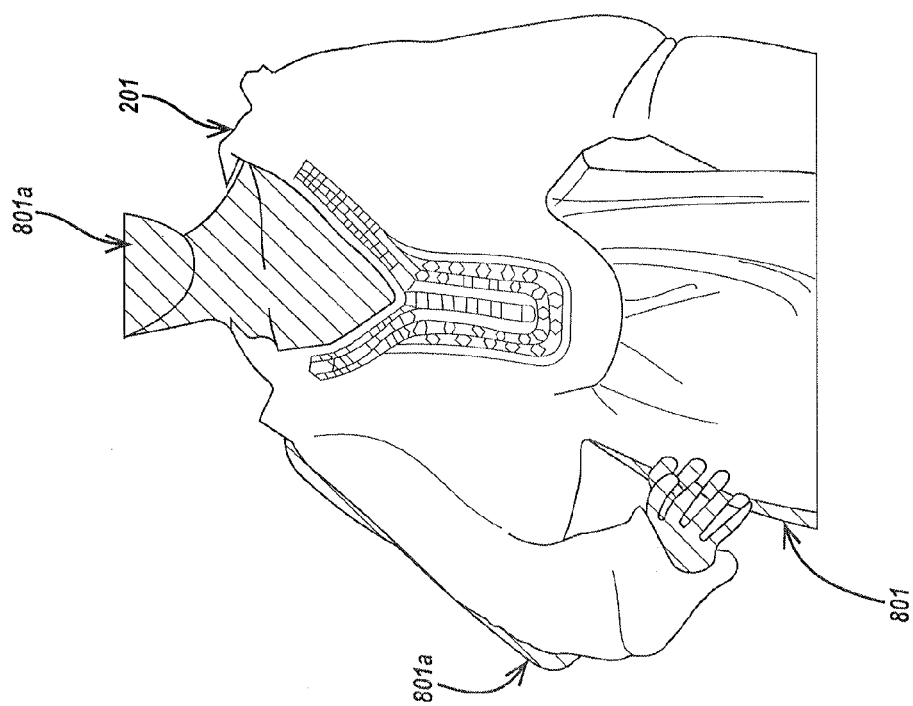

A second aspect of the invention is now described with reference to FIG. 8 and relates to addressing the problem caused by small amounts of misalignment between the actual garment image sprite 201 when overlaid on a canonical body model image 801. The canonical body model image 801 is an image of the canonical body model 801a, possibly obtained from a real image of the mannequin 101a/b without garments being worn. This canonical body model 801a may be obtained from a photograph of the mannequin 101a/b before or after combined images of the mannequin 101a/b and garments have been obtained. Alignment problems can arise (i) because of slight variations in mannequin pose introduced by assembly and disassembly of the mannequin during dressing, (ii) because of variation in camera position, and (iii) because the mannequin can flex with time (under its own weight or that of heavy garments).

In accordance with the invention, image warping is used to compensate for slight misalignment between the garment image sprite 201 and a body model image 801 onto which the garment sprite 201 is overlaid. As shown in FIG. 8, the image warping performed by a processing device of the present invention defines a plurality of first control points 802 on the misaligned garment image sprite 201 and a corresponding plurality of second control points 803 of positions in a desired output image 804. A mathematical model is used to compute a geometric mapping that relates control point positions in the input image precisely to control point positions in the output image. One such model which could be used is the Thin Plate Spline model (which gives a smooth mapping from input to output). Finally, this mapping is used to relate all pixel positions in the output image 804 back to their corresponding positions in the input canonical body model image 801.

It is a feature of the present invention to determine automatically the location of the first control points 802 in the garment image sprite 805 so that these can be mapped to corresponding second control points 803 on the canonical body model image 801. A problem is that the mannequin might not be precisely aligned (in the camera image frame) with the canonical view the body model. Defining control points 802 manually is time consuming. The present invention computes a warp field relating points in the garment sprite 201 to their "known" correspondences in a canonical view of the body model. In order to determine the first control points 802, pre-defined, known control points on a mannequin are added to the images which are obtained of the garment 110 and mannequin. In this way, when the garment image sprite 201 is obtained according to the invention (as described above), the first control points 802 can be automatically generated in the image sprite data based on the pre-defined, known control points of the mannequin, and subsequently used to map/warp the garment image sprite 201 to the second control points 803 in the canonical body model image 801. Hence, a warped garment image sprite 812 is obtained.

Figure 9:
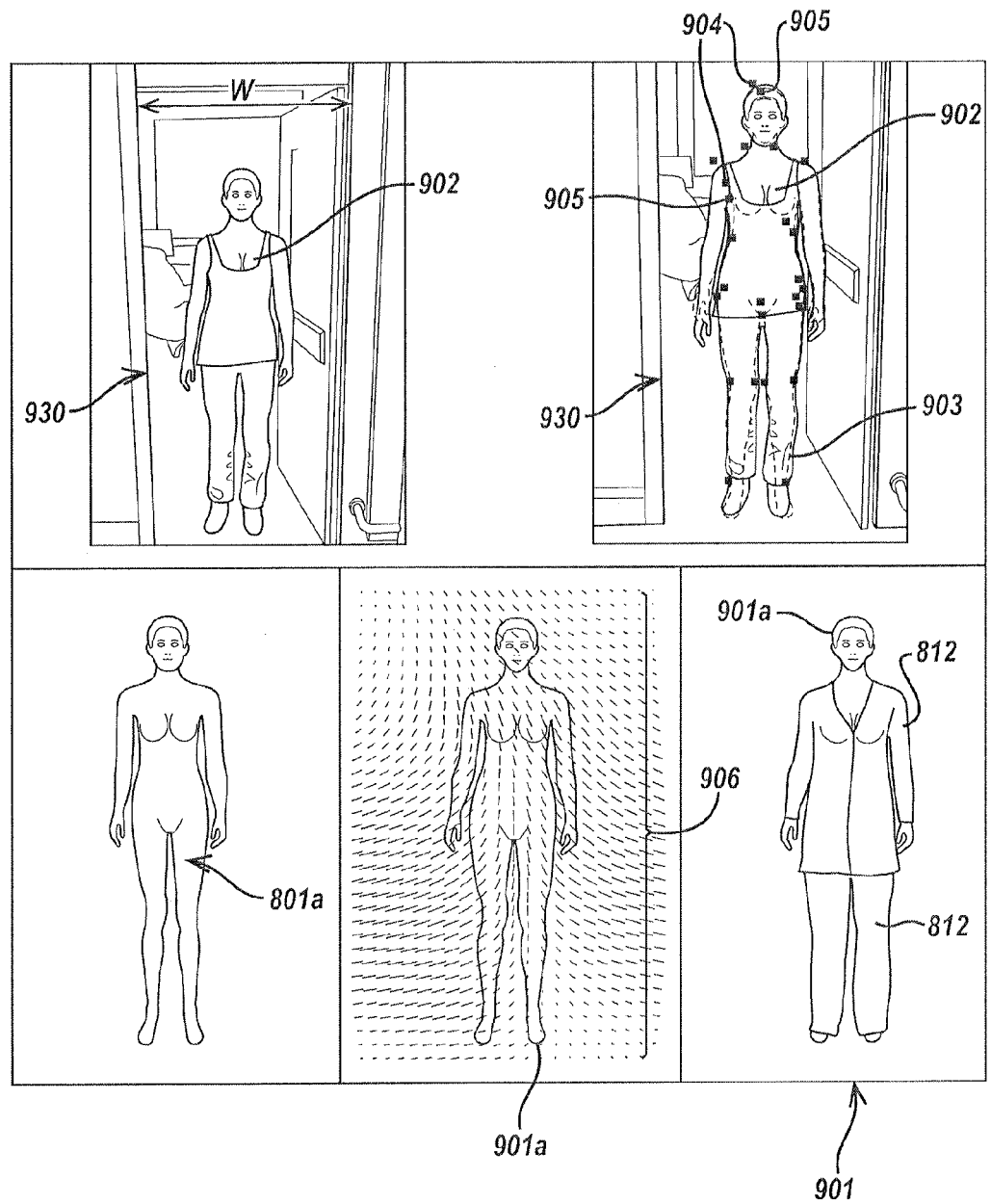
FIG. 9 shows how real-life body models are generated according to one embodiment of the invention.

A third aspect of the invention is now described with reference to FIG. 9. Having now obtained a warped garment image sprite 812 which fits a canonical body model 801a, it is desirable to provide a real-life body model image 901 with a real-life body model 901a having the same shape, size and position as the canonical body model 801a and onto which the warped garment sprite 812 can be overlaid. The real-life body model image 901 is obtained as follows:

1. A real-life subject 902 is photographed in a doorway 930 or other rectangular or square structure so that perspective distortion can be eliminated by image rectification.
2. Body model warp control points 904 are added and manipulated by a user using a processing device to show the corresponding position on the real-life subject with subject control points 905. A mathematical model is used to compute a geometric mapping that relates control point positions in the input image precisely to control point positions in the output image. One such model which could be used is the Thin Plate Spline model (which gives a smooth mapping from input to output).
3. A silhouette 903 of a chosen canonical body model 801a is then warped by the processor based on the control points so that the silhouette 903 matches the subject's silhouette in a rectified image frame 905. This generates a warp field 906.
4. The warp field 906 is applied by the processing device to the canonical body model 801a with an overlaid warped garment image sprite 812 to provide a real-life body model image 901 of the real-life body model 901a.

By taking a real-life photograph of the subject in a doorway 930 as per step 1, it is possible to rectify the view and thereby correct for the effects of perspective distortion. Typically a single known dimension, such as the width W of the doorway 903, or the subject's height, could be used to fix the scale. The image can then be mapped via a 2D-2D perspective transformation into a new rectified coordinate frame in which the rectangular door frame (which appeared as a general quadrilateral in the original image) appears as a rectangle. As a result, in the rectified frame, distances can be measured directly in meaningful units.

The real life body model 901a is generated, in one embodiment of the invention, according to process which is described below. The aim is to develop a three-dimensional body model of a user from measurements of the user. This is achieved from the input of known body dimensions of the user (e.g., height, weight, chest circumference, waist circumference and hip circumference), or taking two-dimensional image measurements from photographs of the user.

In a first stage, standard body size measurements for a representative sample of the human population are obtained for use as predefined measured training data in generating predefined body models by using a standard three-dimensional parametric body model to obtain dense three-dimensional predefined body models.

In a second stage, a relationship between a subset of the standard body size measurements and the parameters defining the predefined body models is generated and can then be used to predict the body shape from any query input measurements, such as those from a user.

For the first stage, compact representations of predefined body shapes are generated. A common technique is to decompose three-dimensional body shapes of any body (either a standard sample test subject, or a user) into a linear combination of body morph parameters. This can be achieved according to the following mathematical expression defining the body model vector, V, where:

$$V = V_0 + y^T \Delta V = V_0 + \sum_{j=1}^{P} y_j \Delta V_j$$

where $V_0$ refers to the zero body shape of the standard body model and $\Delta V_j$ (j=1, 2, ..., P) are different modes of body morphs. In this way, any body shapes can be concisely represented by a vector of P-dimensional morph mapping parameters $y=(y_1, y_2, \ldots y_P)$ with respect to the standard body model.

In one embodiment of the present invention, standard subject or predefined morph mapping parameters are used with respect to the standard body model to define the subject or predefined body model. These morphing parameters permit customisation of the dimension and the shape and geometry of the body as well as individual body parts.

For generating a set of predefined body models, training data is obtained from standard body measurements of a training population sample (e.g. 1000 bodies). In order to obtain the detailed predefined body model of each instance in the training set, we register a three-dimensional morphable human body model based on these body measurements.

One or more standard body measurements from a dataset generated by measuring real-life bodies from a population sample are selected. Body model dimensions are computed directly onto vertex coordinates of a three-dimensional mesh body model. For certain length measurements and body characteristics, e.g., sex, arm length and inside leg length, corresponding vertex-wise distances on a body model mesh are determined; while for circumference measurements, e.g., chest circumference, we proper planes intersecting with the three-dimensional mesh are identified and body model parameters are determined based on the convex hull of the intersection using Graham scan algorithm (see R. Graham: "An efficient algorithm for determining the convex hull of a finite planar set" (1972)).

In one embodiment, for example, a plurality of measurements are extracted from the training dataset, including: height, weight, full chest circumference or perimeter, under chest circumference or perimeter, waist circumference or perimeter, hip circumference or perimeter, inside leg length, arm scye circumference or perimeter, thigh circumference or perimeter, arm length, upper arm length, waist height, knee height, vertical trunk length, total crotch length, and waist front length.

The morph mapping parameters y are then manipulated so as to minimize the error between the actual body measurements and the measurements extracted from the three-dimensional mesh model.

This can, for example, be formulated as the following non-linear optimisation problem as the following equation shows:

$$y_{opt} = \underset{y}{\mathrm{argmin}} \sum_{i=1}^{M} \|f_i(V) - m_{i,0}\|^2$$
$$= \underset{y}{\mathrm{argmin}} \sum_{i=1}^{M} \|f_i(V_0 + y^T \Delta V) - m_{i,0}\|^2$$

where $f_i(V)$ is the non-linear function which extracts the i-th measurement on the mesh V. An adaptive-scale line search can be used to solve this optimisation problem.

Figure 10A:
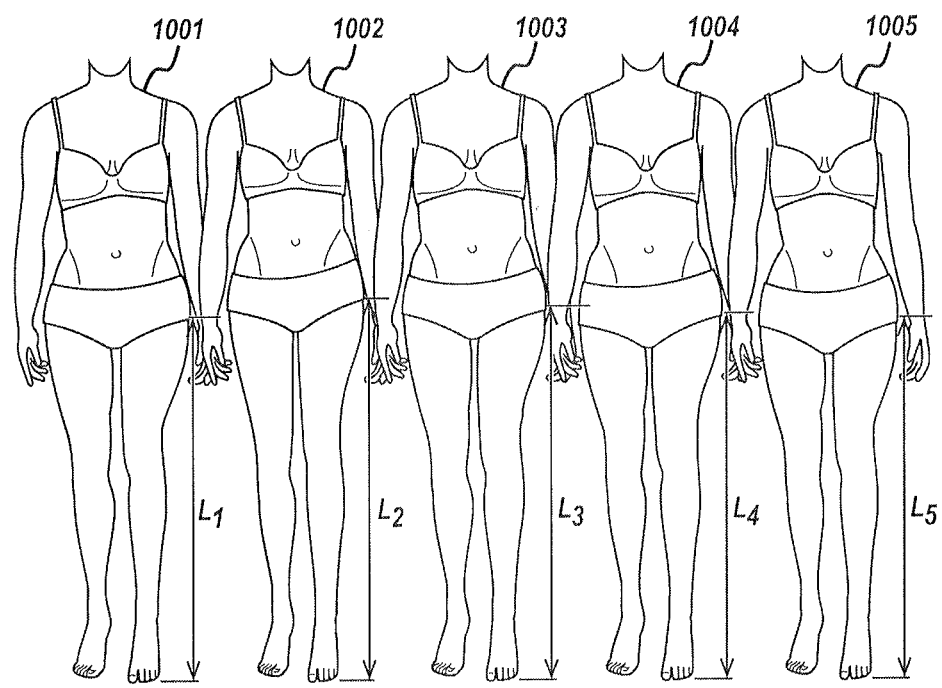
FIGS. 10a and 10b show a real example of how predefined body models (FIG. 10a) are used to generate a subject body model (FIG. 10b) according to the embodiment of FIG. 9.

By way of an example, the resulting predefined body models for a set of five female real-life subjects generated from real-life measured training data are shown in FIG. 10a. Each predefined body model 1001, 1002, 1003, 1004 and 1005 has minor differences in dimensions and shape as a result of differences between the individuals on which they are based (e.g. the lengths $L_1$, $L_2$, $L_3$, $L_4$, $L_5$ of the leg from a control point on the tip of the heel to a control point on the maximum extent of the hip) may all be different.

In a second stage, whereby a subject body model is generated for a specific user subject, a subset of subject body measurements and characteristics is acquired for that user, and a subject body model is generated on the basis of an appropriate training database (e.g. a database appropriate to the user's sex). The database contains N pairs of known predefined body morph mapping parameters from the generated predefined body models, i.e. $(y_1, z_1), (y_2, z_2), \ldots, (y_N, z_N)$. The generation of the subject body model from the predefined body models can be formulated into a regression problem. Given a new real-life input measurement vector $z^*$, a normalised Parzen window regressor, a non-parametric regressor, is used to generate the corresponding subject morph mapping parameters $y^*$ based on all the nearby predefined training data, as the following equation shows:

$$y^* = \frac{\sum_{i=1}^{N} \Phi(z^*, z_i) y_i}{\sum_{i=1}^{N} \Phi(z^*, z_i)}$$

where the kernel function is:
$\Phi(z^*, z_i) = N(z^*|z_i; \sigma^2 I) = C \exp(-\|z^*-z_i\|^2/2\sigma^2)$ ($i=1, 2, \ldots, N$), and $\sigma$ is the radius of the smoothing kernel.

The regression output $y^*$ is a linear combination of training instances $\{y_i\}_{i=1}^{N}$, and the kernel function $\Phi(z^*, z_i)$ serves as a weighting factor which is inversely related to the distance between query $z^*$ and the instance $z_i$ in the measurement space.

Figure 10B:
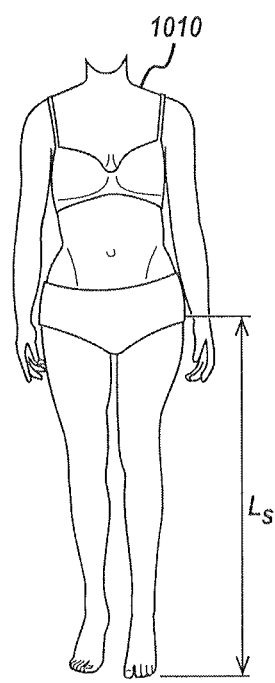

The generated morph mapping parameters for the subject body model (with respect to the standard body model) define the subject body model, as shown in FIG. 10b, which is a real output of a subject body model obtained by inputting certain input subject body measurements of the subject into the aforementioned process and using the predefined body models of FIG. 10a.

The input subject measurements or characteristics may include: sex, height, weight, full chest circumference or perimeter, under chest circumference or perimeter, waist circumference or perimeter, hip circumference or perimeter, inside leg length, arm scye circumference or perimeter, thigh circumference or perimeter, arm length, upper arm length, waist height, knee height, vertical trunk length, total crotch length, and waist front length (e.g. the length, $L_S$, of the leg from a control point on the tip of the heel to a control point on the maximum extent of the hip).

Compared with the nearest neighbour regressor, the normalised Parzen window regressor guarantees a smoother transition of body shapes with the changing of input measurements. The computational complexity is in proportion to the size of the training set N.

It will of course be understood that the present invention has been described above purely by way of example and modifications of detail can be made within the scope of the invention.

The invention claimed is:

1. A method for generating an image of an object in a scene, comprising:
emitting electromagnetic radiation having a first spectral power distribution from a surface of a first foreground object, which is adjacent or at least partially obscured by a second foreground object;
acquiring a first image of both the first and second foreground objects whilst the first foreground object emits electromagnetic radiation with the first spectral power distribution;
acquiring a second image of the first and second foreground objects whilst the first foreground object is not emitting electromagnetic radiation or is emitting electromagnetic radiation with a second spectral power distribution which is different to the first spectral power distribution;
generating an image of the second foreground object without the first foreground object by comparing the first image and second image.

2. The method of claim 1, wherein the step of generating comprises generating an alpha matte of the first and second foreground objects based on a comparison of the first image and second image.

3. The method of claim 2, wherein the step of generating the alpha matte comprises measuring and comparing the colour variation between corresponding pixels in the first image and second image.

4. The method of claim 2, wherein the step of generating the alpha matte comprises measuring and comparing the brightness of corresponding pixels in the first image and second image.

5. The method of claim 2, wherein the step of generating the alpha matte comprises subtracting pixel vectors of the second image from pixel vectors of corresponding pixels of the first image, or vice-versa.

6. The method of claim 5, wherein each pixel vectors is a 3-vector of RGB values.

7. The method of claim 3, wherein corresponding pixels are pixels located in the same image location in the first image and second image.

8. The method of claim 1, wherein the first image and second image are acquired from identical locations by an image acquisition device having a fixed location.

9. The method of claim 1, wherein the alpha matte is data which is a representation of whether a pixel is a desired foreground pixel or an unwanted foreground pixel.

10. The method of claim 9, wherein the alpha matte comprises data representative of the opacity of a desired foreground pixel with respect to an unwanted foreground pixel.

11. The method of claim 1, wherein the first foreground object is coated in a fluorescent coating which is responsive to ultra violet light,
wherein the step of emitting electromagnetic radiation at a first spectral power distribution comprises illuminating the first foreground object with ultra violet radiation from an ultra violet light source so that the first foreground object is caused to emit light.

12. The method of claim 11, wherein the first and second images are acquired with an image acquisition device and the ultra violet light source emits ultra violet light from a location which is located less than 100, 50, 25, 10, 5, 4, 3, 2, or 1 centimeters from the optical centre of the image acquisition device.

13. The method of claim 11, wherein the step of acquiring a second image is carried out when the first foreground object is not being illuminated with ultra violet light from the ultra violet light source.

14. The method of claim 1, wherein the step of emitting electromagnetic radiation at a first spectral power distribution comprises generating the electromagnetic radiation within the first foreground object so that the surface of the first foreground object emits electromagnetic radiation from its surface,
wherein the electromagnetic radiation is generated within the first foreground object at a second spectral power distribution for acquisition of the second image.

15. The method of claim 14, wherein the first foreground object comprises a semi-translucent outer shell and a radiation source inside the shell which is adapted to generate electromagnetic radiation having two different spectral power distributions.

16. The method of claim 11, wherein external illumination of the first and second foreground objects is substantially identical during acquisition of the first and second images.

17. The method of claim 1, wherein the first foreground object is a mannequin and the second foreground object is an item of clothing.

18. The method of claim 1, wherein the electromagnetic radiation is visible light.

19. The method of claim 1, further comprising extracting an image sprite of an item of clothing by applying the alpha mattes to one of the first or second images.

20. A method of generating an image of a body model, comprising:
overlaying the image sprite obtained in accordance with claim 19 onto a body image.

21. The method of claim 20, further comprising:
warping the image sprite to match the form of a body in the body image.

22. A system for generating an image of a foreground object in a scene, comprising:
a first foreground object adapted to emit electromagnetic radiation having a first spectral power distribution from its surface;
a second foreground object which is adjacent or at least partially obscuring the first foreground object;
an image acquisition device configured to acquire a first image of the first and second foreground objects whilst the first foreground object emits electromagnetic radiation with the first spectral power distribution, and a second image of the first and second foreground objects whilst the first foreground object is not emitting electromagnetic radiation or is emitting electromagnetic radiation with a second spectral power distribution which is different to the first spectral power distribution; and
a processor in communication with the image acquisition device and configured to generate an image of the second foreground object without the first foreground object by comparing the first image and second image.

23. The system of claim 22, wherein the processor is configured to generate the image by generating an alpha matte of the first and second foreground objects based on a comparison of the first image and second image.

24. The system of claim 23, wherein the processor is configured to generate the alpha matte by subtracting pixel vectors of pixels the second image from pixel vectors of corresponding pixels of the second image, or vice-versa.

25. The system of claim 24, wherein corresponding pixels are pixels located in the same image location in the first image and second image.

26. The system of claim 22, wherein the image acquisition device has a fixed position relative to the scene when acquiring the first and second images.

27. The system of claim 22, wherein the alpha matte comprises data which is a representation of whether a pixel in an image of the scene is a desired foreground pixel or an unwanted foreground pixel.

28. The system of claim 22, further comprising an ultra violet light source which is adapted to illuminate the first foreground object with ultra violet radiation for acquisition of the first image, wherein the first foreground object is coated in a fluorescent coating which is responsive to ultra violet light.

29. The system of claim 28, wherein the ultra violet light source emits ultra violet light from a location which is located less than 100, 50, 25, 10, 5, 4, 3, 2, or 1 centimeters from the optical centre of the image acquisition device.

30. The system of claim 22, further comprising a controllable light source within the first foreground object, wherein the controllable light source is adapted to emit electromagnetic radiation at a first spectral power distribution so that the surface of the first foreground object emits electromagnetic radiation from its surface for acquisition of the first image, and wherein the controllable light source is adapted to emit electromagnetic radiation within the first foreground object at a second spectral power distribution for acquisition of the second image.

31. The system of claim 30, wherein the first foreground object comprises a semi-translucent outer shell.

32. The system of claim 22, wherein the first foreground object is a mannequin and the second foreground object is an item of clothing.

33. A mannequin having an external surface for carrying garments, comprising:
emitting means adapted to emit electromagnetic radiation from the external surface with a first spectral power distribution,
wherein the emitting means is adapted to be controllable to emit electromagnetic radiation with a second spectral power distribution which is different to the first spectral power distribution.

34. The mannequin of claim 33, wherein the emitting means is a controllable light source contained within the mannequin, and wherein the mannequin is formed of translucent, or semi-translucent, material.

35. A mannequin having an external surface for carrying garments, comprising:
emitting means adapted to emit electromagnetic radiation from the external surface with a first spectral power distribution when illuminated with ultra-violet light.

36. The mannequin of claim 35, wherein the emitting means is a fluorescent on the external surface.

37. A computer program product comprising computer executable instructions, which, when executed on a computer, cause the computer to generate an alpha matte of first and second foreground objects based on a comparison of a first image and second image, wherein the first image of the first and second foreground objects is acquired whilst the first foreground object emits electromagnetic radiation with a first spectral power distribution, and the second image of the first and second foreground objects is acquired whilst the first foreground object is not emitting electromagnetic radiation or is emitting electromagnetic radiation with a second spectral power distribution which is different to the first spectral power distribution.

\* \* \* \* \*